(12) United States Patent
Miura

(10) Patent No.: US 8,026,193 B2
(45) Date of Patent: *Sep. 27, 2011

(54) METAL OXIDE PARTICLE, PRODUCTION PROCESS THEREOF AND EXHAUST GAS PURIFYING CATALYST

(75) Inventor: Masahide Miura, Imasato (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 220 days.

This patent is subject to a terminal disclaimer.

(21) Appl. No.: 10/589,669

(22) PCT Filed: Apr. 27, 2005

(86) PCT No.: PCT/JP2005/008465
§ 371 (c)(1),
(2), (4) Date: Aug. 16, 2006

(87) PCT Pub. No.: WO2005/102524
PCT Pub. Date: Nov. 3, 2005

(65) Prior Publication Data
US 2008/0051283 A1    Feb. 28, 2008

(30) Foreign Application Priority Data
Apr. 27, 2004   (JP) .................. 2004-131646

(51) Int. Cl.
*B01J 23/00* (2006.01)
*B01J 23/10* (2006.01)
*B01J 23/58* (2006.01)
*B01J 23/42* (2006.01)
*B01J 23/44* (2006.01)

(52) U.S. Cl. ......... 502/304; 502/328; 502/339; 502/349
(58) Field of Classification Search ................ 502/349, 502/302–304, 328, 339–340
See application file for complete search history.

(56) References Cited

U.S. PATENT DOCUMENTS

| 4,422,960 A | 12/1983 | Shiroto et al. |
| 4,448,895 A | 5/1984 | Ono et al. |
| 4,981,825 A | 1/1991 | Pinnavaia et al. |
| 5,182,249 A | 1/1993 | Wang et al. |
| 5,232,889 A | 8/1993 | Blanchard et al. |

(Continued)

FOREIGN PATENT DOCUMENTS

AU    B-10648/88    12/1990

(Continued)

OTHER PUBLICATIONS

U.S. Appl. No. 10/588,603, filed Aug. 7, 2006 in the name of Takeshi Hirabayashi et al.

(Continued)

*Primary Examiner* — Steven Bos
*Assistant Examiner* — Anthony J Zimmer
(74) *Attorney, Agent, or Firm* — Oliff & Berridge, PLC

(57) ABSTRACT

The present invention provides a metal oxide having a combination of multiple properties useful in the production of an exhaust gas purifying catalyst, a production process thereof, and an exhaust gas purifying catalyst for purifying the components in an exhaust gas. The metal oxide particle of the present invention comprises a core part 1 relatively rich in a ceria-zirconia solid solution and a surface layer 2 relatively rich in a second metal oxide such as ceria or zirconia.

6 Claims, 1 Drawing Sheet

U.S. PATENT DOCUMENTS

| | | | |
|---|---|---|---|
| 5,334,570 | A | 8/1994 | Beauseigneur et al. |
| 5,346,875 | A | 9/1994 | Wachter et al. |
| 5,352,646 | A | 10/1994 | Blanchard et al. |
| 5,439,865 | A | 8/1995 | Abe et al. |
| 5,492,870 | A | 2/1996 | Wilcox et al. |
| 5,607,892 | A | 3/1997 | Chopin et al. |
| 5,753,581 | A | 5/1998 | Beckmeyer et al. |
| 6,083,868 | A | 7/2000 | Yoshida et al. |
| 6,358,880 | B1* | 3/2002 | Hedouin et al. ............ 502/302 |
| 6,524,992 | B2 | 2/2003 | Mussmann et al. |
| 6,528,451 | B2 | 3/2003 | Brezny et al. |
| 6,569,392 | B1 | 5/2003 | Li et al. |
| 6,773,814 | B2 | 8/2004 | Schumacher et al. |
| 6,911,414 | B2* | 6/2005 | Kimura et al. ............ 502/349 |
| 7,314,846 | B2 | 1/2008 | Kuno |
| 7,384,888 | B2 | 6/2008 | Kuno |
| 2002/0049137 | A1 | 4/2002 | Morikawa et al. |
| 2002/0098975 | A1* | 7/2002 | Kimura et al. ............ 502/304 |
| 2003/0007926 | A1* | 1/2003 | Jiang et al. ............... 423/651 |
| 2004/0082468 | A1* | 4/2004 | Suzawa et al. ............ 502/302 |
| 2004/0087440 | A1* | 5/2004 | Kuno ........................ 502/304 |
| 2004/0186016 | A1* | 9/2004 | Bog et al. ................. 502/304 |
| 2005/0059547 | A1 | 3/2005 | Kuno |
| 2007/0129246 | A1 | 6/2007 | Miura |
| 2007/0179052 | A1 | 8/2007 | Hirabayashi et al. |
| 2007/0197373 | A1 | 8/2007 | Miura et al. |
| 2007/0197379 | A1 | 8/2007 | Miura |
| 2008/0051283 | A1 | 2/2008 | Miura |

FOREIGN PATENT DOCUMENTS

| | | |
|---|---|---|
| CN | 88 1 00589 | 9/1988 |
| CN | 1060793 A | 5/1992 |
| CN | 1316296 | 10/2001 |
| CN | 1317366 | 10/2001 |
| EP | 0 430 744 A | 6/1991 |
| EP | 0 524 643 A | 1/1993 |
| EP | 1 175 935 A | 1/2002 |
| EP | 1 284 277 A1 | 2/2003 |
| EP | 1 371 415 A1 | 12/2003 |
| EP | 1 415 956 A2 | 5/2004 |
| EP | 1 516 855 A1 | 3/2005 |
| EP | 1 579 912 A2 | 9/2005 |
| FR | 2 836 067 A | 8/2003 |
| JP | A-03-277060 | 12/1991 |
| JP | A-06-279027 | 10/1994 |
| JP | A-8-103650 | 4/1996 |
| JP | A-8-109020 | 4/1996 |
| JP | A-8-109021 | 4/1996 |
| JP | A-9-255331 | 9/1997 |
| JP | A-10-194742 | 7/1998 |
| JP | A-10-258232 | 9/1998 |
| JP | A-2000-319019 | 11/2000 |
| JP | A-2001-89143 | 4/2001 |
| JP | A-2002-110261 | 4/2002 |
| JP | A-2002-331238 | 11/2002 |
| JP | A-2002-346386 | 12/2002 |
| JP | A-2003-117393 | 4/2003 |
| JP | A-2003-277060 | 10/2003 |
| JP | A-2004-074138 | 3/2004 |
| JP | A-2005-254047 | 9/2005 |
| JP | A-2005-313024 | 11/2005 |
| JP | A-2005-313028 | 11/2005 |
| JP | A-2005-314134 | 11/2005 |
| KR | 10-0295168 B1 | 9/2001 |
| WO | WO 03/037506 A1 | 5/2003 |
| WO | WO 2005/102933 A2 | 11/2005 |
| WO | WO 2007/113674 A2 | 10/2007 |

OTHER PUBLICATIONS

Office Action (Non-Final Rejection) issued in U.S. Appl. No. 10/588,603, filed Aug. 19, 2008.

Office Action (Non-Final Rejection) issued in U.S. Appl. No. 10/588,603, filed Apr. 1, 2009.

Notice of Allowance issued in U.S. Appl. No. 10/588,603, filed Nov. 24, 2009.

U.S. Appl. No. 10/589,421, filed Aug. 15, 2006 in the name of Masahide Miura.

Office Action (Non-Final Rejection) issued in U.S. Appl. No. 10/589,421, filed Sep. 17, 2008.

Office Action (Non-Final Rejection) issued in U.S. Appl. No. 10/589,421, filed Apr. 14, 2009.

Notice of Allowance issued in U.S. Appl. No. 10/589,421, filed Sep. 18, 2009.

U.S. Appl. No. 12/451,089, filed Oct. 26, 2009 in the name of Masahide Miura.

U.S. Appl. No. 10/593,629, filed Sep. 21, 2006 in the name of Masahide Miura.

Office Action (Non-Final Office Action) issued in U.S. Appl. No. 10/593,629, filed Mar. 25, 2010.

John Dalton Wright et al., Sol-Gel Materials: Chemistry and Applications, 2001, CRC Press, pp. 3-6.

Dec. 27, 2010 Office Action issued in U.S. Appl. 10/593,629.

* cited by examiner

METAL OXIDE PARTICLE, PRODUCTION PROCESS THEREOF AND EXHAUST GAS PURIFYING CATALYST

TECHNICAL FIELD

The present invention relates to a metal oxide particle, a production process thereof, and an exhaust gas purifying catalyst produced from the metal oxide particle.

RELATED ART

The exhaust gas from internal combustion engines such as automobile engines contains nitrogen oxide (NO.), carbon monoxide (CO), hydrocarbon (HC) and the like. These substances can be purified by using an exhaust gas purifying catalyst capable of oxidizing CO and HC and, at the same time, reducing $NO_x$. As for representative exhaust gas purifying catalysts, three-way catalysts where a noble metal such as platinum (Pt), rhodium (Rh) and palladium (Pd) is supported on a porous metal oxide support such as γ-alumina are known.

The metal oxide support may be formed of various materials but, in order to obtain a high surface area, alumina ($Al_2O_3$) has been heretofore generally used. However, in recent years, for accelerating the purification of the exhaust gas by using chemical properties of the support, it has been proposed to use various other materials such as ceria ($CeO_2$), zirconia ($ZrO_2$) and titanium ($TiO_2$) in combination with, or not in combination with, alumina.

For example, in order to alleviate the fluctuation of oxygen concentration in the exhaust gas and thereby increase the exhaust gas purifying ability of the three-way catalyst, a material having an oxygen storage capacity (OSC) of storaging oxygen when the oxygen concentration in the exhaust gas is high, and releasing oxygen when the oxygen concentration in the exhaust gas is low, is used as a support for the exhaust gas purifying catalyst. A representative material having OSC is ceria.

In order to allow for efficient progress of oxidation of CO and HC and reduction of $NO_x$ by the activity of the three-way catalyst, the air-fuel ratio in the internal combustion engine must be a theoretical air-fuel ratio (stoichiometric air-fuel ratio). Therefore, the fluctuation of oxygen concentration in the exhaust gas is preferably alleviated to maintain the oxygen concentration in the vicinity of the theoretical air-fuel ratio, so that the three-way catalyst can exert its exhaust gas purifying ability. Furthermore, according to recent studies, it has been found that ceria not only has OSC but also, by virtue of its strong affinity for a noble metal, particularly platinum, can prevent particle growth (sintering) of the noble metal supported thereon.

In this way, ceria has preferred properties for use in an exhaust gas purifying catalyst but sometimes fails in satisfying heat resistance required in such usage.

Accordingly, a method for elevating the heat resistance of ceria by forming a solid solution of ceria and zirconia has been developed (see, for example, Japanese Unexamined Patent Publication (Kokai) No. 10-194742 and 6-279027).

Further, Japanese Unexamined Patent Publication (Kokai) No. 2004-74138 discloses a ceria-based particle used as a catalyst support wherein the outer part of the particle is rich in ceria and inner part of the particle is poor in ceria. The reference states that the ceria-based particle suppress particle growth of the noble metal supported thereon due to the outer part of the particle rich in ceria; and provides less capacity of oxygen storing and releasing due to the inner part of the particle poor in ceria. The ceria-based particle is produced by a method of impregnating $ZrO_2$ power or $AlO_2$ powder with aqueous cerium nitrate solution, and firing it; a method of precipitating $ZrO_2$ precursor from zirconium oxynitrate solution, adding aqueous cerium nitrate solution thereto, precipitating $CeO_2$ precursor onto the $ZrO_2$ precursor, and then firing it; and a method of hydrolyzing cerium alkoxide on $ZrO_2$ precursor or $CeO_2$ precursor, and then firing it.

The solid solution wherein ceria and zirconia are uniformly mixed is known to have good OSC and heat resistance. However, the composite metal oxide does not always allow ceria to satisfactorily bring out its property of preventing sintering of a noble metal such as platinum. This is because ceria and zirconia both are present on the surface of this composite metal oxide and therefore, a part of the noble metal is supported on the zirconia portion rather than on the ceria portion and cannot be prevented from sintering in some cases.

On the other hand, rhodium supported on zirconia is known to exert a good catalytic performance. When a ceria-zirconia solid solution is used, rhodium is randomly supported on both ceria and zirconia and cannot be supported intensively on the zirconia portion.

Accordingly, the present invention provides a metal oxide particle capable of combining OSC provided by the ceria-zirconia solid solution, and the property of other metal oxide, such as prevention of sintering of noble metal. The present invention also provides a production process thereof, and an exhaust gas purifying catalyst produced from this metal oxide particle.

DISCLOSURE OF INVENTION

The metal oxide particle of the present invention comprises a core part relatively rich in a ceria-zirconia solid solution, and a surface layer relatively rich in a second metal oxide, particularly the core part and the surface layer each comprises a plurality of primary particles.

According to the metal oxide particle of the present invention, OSC provided by the ceria-zirconia solid solution in the core part, and the property of the second metal oxide in the surface layer can be achieved in combination.

The term "relatively rich in" as used herein for the metal oxide constituting a core part and a surface layer is used with respect to the molar fraction based on the total molar number of metals in each of the core part and the surface layer. Accordingly, for example, the "core part relatively rich in a ceria-zirconia solid solution" means that the molar fraction of cerium (Ce) and zirconium (Zr) constituting the ceria-zirconia solid solution in the core part is higher than the molar fraction of the cerium and zirconium in the surface layer.

In one embodiment of the metal oxide particle of the present invention, the second metal oxide is ceria.

According to this embodiment, OSC can be provided by the ceria-zirconia solid solution in the core part, and when a noble metal, particularly platinum, is supported on this metal oxide particle, sintering of the noble metal can be prevented by virtue of ceria in the surface layer.

In one embodiment of the metal oxide particle of the present invention, the second metal oxide is zirconia.

According to this embodiment, OSC can be provided by the ceria-zirconia solid solution in the core part, and high heat resistance can be provided by the zirconia in the surface layer. Furthermore, when rhodium is supported on this metal oxide particle, good catalyst performance can be provided by virtue of the combination of zirconia in the surface layer and rhodium supported thereon.

In such a metal oxide particle comprising a surface layer relatively rich in ceria or zirconia, the total molar fraction of cerium and zirconium may be at least 85 mol %, particularly at least 90 mol %, more particularly at least 95 mol %, based on the total molar number of metals in the metal oxide particle.

In one embodiment of such a metal oxide particle comprising a surface layer relatively rich in ceria or zirconia, the surface layer further comprises an oxide of at least one metal selected from alkaline earth metals and rare earths, particularly yttrium oxide ($Y_2O_3$), in addition to ceria or zirconia.

According to this metal oxide particle, the surface layer is improved in the heat resistance and/or oxygen conductivity, and OSC provided by the ceria-zirconia solid solution in the core part can be successfully utilized.

The exhaust gas purifying catalyst of the present invention comprises a noble metal supported on the above-described metal oxide particle of the present invention.

According to the exhaust gas purifying catalyst of the present invention, the catalyst can have both OSC provided by the ceria-zirconia solid solution in the core part, and the property of the noble metal supported on the surface layer of the metal oxide particle.

In one embodiment of the exhaust gas purifying catalyst of the present invention, platinum is supported on the metal oxide particle of the present invention and the second metal oxide is ceria.

According to this exhaust gas purifying catalyst, OSC provided by the ceria-zirconia solid solution in the core part, and the effect of preventing sintering of platinum by the ceria in the surface layer can be achieved.

In another embodiment of the exhaust gas purifying catalyst of the present invention, rhodium is supported on the metal oxide particle of the present invention and the second metal oxide is zirconia.

According to this exhaust gas purifying catalyst, OSC provided by the ceria-zirconia solid solution in the core part, high heat resistance attributable to zirconia in the surface layer, and catalyst activity, by the combination of zirconia in the surface layer and the rhodium supported thereon, can be achieved.

The process of the present invention for producing a metal oxide particle comprising a core part relatively rich in a ceria-zirconia solid solution and a surface layer relatively rich in a second metal oxide, particularly ceria or zirconia, comprises providing a sol containing at least a population of ceria-zirconia solid solution colloid particles and a population of second metal oxide colloid particles, particularly a population of ceria or zirconia colloid particles, differing in the isoelectric point with each other; adjusting the pH of the sol to be closer to the isoelectric point of the population of ceria-zirconia solid solution colloid particles than to the isoelectric point of the population of second metal oxide colloid particles, particularly into the range of ±1.0, more particularly ±0.5, of the isoelectric point of the population of ceria-zirconia solid solution colloid particles, thereby aggregating the population of ceria-zirconia solid solution colloid particles; adjusting the pH of the sol to be closer to the isoelectric point of the population of second metal oxide colloid particles than to the isoelectric point of the population of ceria-zirconia solid solution colloid particles, particularly into the range of ±1.0, more particularly ±0.5, of the isoelectric point of the population of second metal oxide colloid particles, thereby aggregating the population of second metal oxide colloid particles onto the population of ceria-zirconia solid solution colloid particles aggregated; and drying and firing the obtained aggregate.

According to the process of the present invention, a metal oxide particle comprising a core part relatively rich in a ceria-zirconia solid solution and a surface layer relatively rich in a second metal oxide can be obtained, in which the core part and the surface layer each comprises a plurality of primary particles.

The metal oxide particle obtained by this process can have a relatively small particle diameter and, for example, have an average particle diameter of less than 10 µm, less than 5 µm, less than 1 µm, less than 500 nm, less than 200 nm, less than 100 nm or less than 50 nm, and can have a structure comprising a core part relatively rich in the ceria-zirconia solid solution and a surface layer relatively rich in the second metal oxide. For example, when the sol used as a raw material has an average particle diameter of about 5 nm, the average particle diameter of the metal oxide particle obtained by the process of the present invention can be made to be 50 nm or less.

The term "colloid particles" as used herein means particles which comprises a metal oxide or a metal bonded to oxygen dispersed in a liquid, particularly water, and which produces a metal oxide when the dispersion medium is removed and the residue is fired. The "colloid particles" are generally understood to have a diameter of 1 to 1,000 nm, particularly from 1 to 500 nm. For example, a sol containing colloid particles having a diameter of less than 100 nm or less than 50 nm is available.

The term "sol" as used herein means a dispersion system wherein colloid particles are dispersed in a dispersion medium which is a liquid, and this is sometimes referred to as a colloid solution. The dispersion medium contained in the sol is generally water, but an organic dispersion medium such as alcohol and acetylacetone may be contained, if desired.

BRIEF DESCRIPTION OF THE INVENTION

BEST MODE FOR CARRYING OUT THE INVENTION

Figure 1:
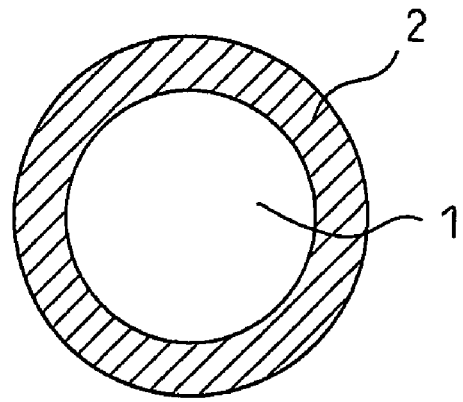
FIG. 1 is a cross-sectional view showing one embodiment of the metal oxide particle of the present invention.
Figure 2:
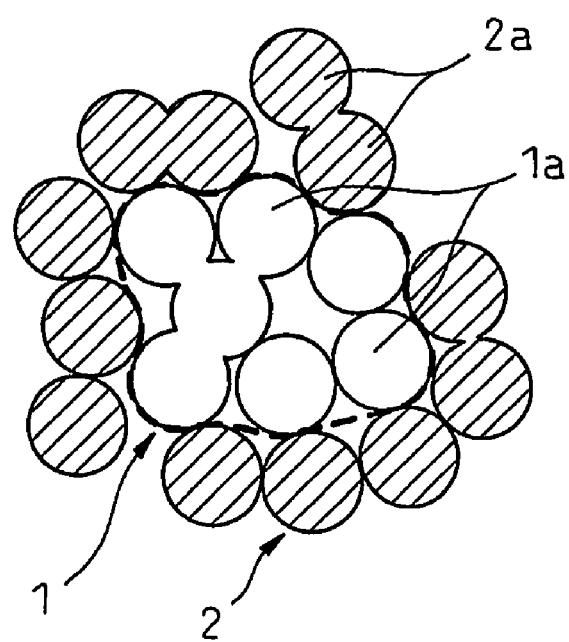
FIG. 2 is a cross-sectional view showing another embodiment of the metal oxide particle of the present invention.

The present invention is described below by referring to FIGS. 1 and 2. FIGS. 1 and 2 each is a cross-sectional view of the metal oxide particle of the present invention.

As shown in FIG. 1, the metal oxide particle of the present invention comprises a core part 1 relatively rich in a ceria-zirconia solid solution, and a surface layer 2 relatively rich in a second metal oxide such as ceria or zirconia. As shown in FIG. 2, the core part 1 and the surface layer 2 each may comprise a plurality of primary particles (1a, 2a).

This metal oxide particle may have an average particle diameter of, for example, less than 10 µm, less than 5 µm, less than 1 µm, less than 500 nm, less than 200 nm, less than 100 nm or less than 50 nm.

The boundary between the core part 1 and the surface layer 2 may not be necessarily distinct, and may appear as a portion where the composition is gradually changed. Furthermore, the boundary part between the core part 1 and the surface layer 2 may be a mixture, particularly a solid solution, of a ceria-zirconia solid solution and a second metal oxide. In FIG. 1, the surface layer 2 is shown as if it is continuous, but the surface layer may be discontinuous.

In the case where the core part and the surface layer each comprises a plurality of primary particles and the metal oxide particle of the present invention is formed from a sol, these primary particles correspond to the colloid particles in the sol, and a distinct boundary may or may not be present between respective primary particles.

As apparent from FIG. 1, in the metal oxide particle of the present invention, a ceria-zirconia solid solution obtained by a conventional technique is itself used as the core part of the metal oxide particle, and a second metal oxide such as ceria or zirconia is used as the surface layer.

As for the second metal oxide used in the present invention, any metal oxide can be selected, and a metal oxide which is preferably exposed to the surface of the metal oxide particle may be selected. As described above, the second metal oxide is preferably ceria or zirconia.

The core part containing a ceria-zirconia solid solution and the surface layer containing zirconia or ceria may contain a metal other than cerium (Ce) and zirconium (Zr), for example, a metal selected from the group consisting of alkaline earth metals and rare earth elements, particularly yttrium (Y). The oxide of these alkaline earth metals and rare earth elements, particularly yttrium, tends to provide excellent heat resistance to zirconia, ceria and/or ceria-zirconia solid solution.

The exhaust gas purifying catalyst of the present invention can be produced by loading a noble metal such as platinum, rhodium and palladium on the metal oxide particle of the present invention.

The noble metal may be loaded on the metal oxide particle by using any known method but, for example, a method of impregnating the metal oxide particle with a solution containing a salt and/or a complex salt of noble metal, and drying and then firing it may be employed. The amount of the noble metal supported on the metal oxide particle may be from 0.01 to 5 mass %, particularly from 0.1 to 2 mass %, based on the metal oxide particle.

The exhaust gas purifying catalyst of the present invention may be used not only by shaping the catalyst itself but also by coating it on a monolith substrate, for example a ceramic honeycomb.

The metal oxide particle of the present invention may be produced by any method but can be produced particularly by the process of the present invention.

Respective steps in the process of the present invention are described below.

<Provision of Mixed Sol>

In the process of the present invention, a sol comprising at least a population of ceria-zirconia solid solution colloid particles and a population of second metal oxide colloid particles, particularly a population of ceria or zirconia colloid particles, differing in the isoelectric point with each other is provided.

Specific examples of the sol provided include substances obtained by hydrolyzing and condensing an alkoxide, an acetylacetonate, an acetate or a nitrate of metal. In addition, sols such as alumina sol, zirconia sol, titania sol and ceria sol are known materials and may also be available as commercial products.

The sol containing a population of ceria-zirconia solid solution colloid particles can be obtained by a general method for obtaining a ceria-zirconia solid solution. More specifically, for example, a solution containing a cerium salt and a zirconium salt is allowed to undergo hydrolysis or condensation and then aged, whereby sol containing a population of ceria-zirconia solid solution colloid particles can be obtained. Generally, the aging is preferably performed at a high temperature and a high pressure, and may be performed, for example, at 120° C. for 72 hours in a pressure vessel.

The metal oxide sol generally available on the market has a pH different from the isoelectric point of the colloid particles contained therein, so that the colloid particles contained can electrostatically repel each other to prevent aggregation. That is, a sol containing colloid particles having an isoelectric point on the alkali side is stabilized by acidifying the sol (acid-stabilized sol), and a sol containing colloid particles having an isoelectric point on the acidic side is stabilized by alkalifying the sol (alkali-stabilized sol).

The isoelectric point of the colloid particles does not necessarily depend on a material itself constituting the particles, such as oxide, but can be arbitrarily set by the surface modification of colloid particles, particularly by the surface modification of colloid particles with an organic compound. Accordingly, each of a population of ceria-zirconia solid solution colloid particles and a population of second metal oxide colloid particles such as a population of ceria or zirconia colloid particles used in the process of the present invention may be selected to have an appropriate pH for the present invention. For example, the populations of colloid particles can be selected to give a difference of at least 3 or more, particularly 4 or more, more particularly 5 or more, between the isoelectric points of the both populations of colloid particles.

The isoelectric point of a population of colloid particles, which must be known for the process of the present invention, may be determined by any method. The isoelectric point can be measured, for example, by an electrophoretic light scattering method.

The sol containing at least two kinds of colloid particles, which can be used in the process of the present invention, may be obtained by any method but, in particular, the sol can be obtained by mixing different sols. The mixing ratio of these groups of colloid particles can be determined depending on the desired properties of the metal oxide particle.

In the process of the present invention, an element such as an alkaline earth metal and a rare earth, which are preferably contained in the metal oxide particle, can be contained in the sol not only as colloid particles but also as a metal salt such as nitrate.

<Aggregation of Ceria-Zirconia Solid Solution>

In the process of the present invention, the pH of the sol is then adjusted to be closer to the isoelectric point of the population of ceria-zirconia solid solution colloid particles than to the isoelectric point of the population of second metal oxide colloid particles, thereby aggregating the population of ceria-zirconia solid solution colloid particles.

As described above, the sol generally available on the market has a pH different from the isoelectric point of colloid particles contained therein, so that the colloid particles can have a large positive or negative electric charge to prevent precipitation by electrostatic effect. Accordingly, when the pH of a sol containing a population of ceria-zirconia solid solution colloid particles and a population of second metal oxide colloid particles is changed to the vicinity of the isoelectric point of the population of ceria-zirconia solid solution colloid particles, the zeta potential of the population of ceria-zirconia solid solution colloid particles becomes small, and this allows for little generation of electrical repulsion between particles, whereby aggregation of the population of ceria-zirconia solid solution colloid particles is accelerated. At this stage, the pH of the sol is relatively different from the isoelectric point of the population of second metal oxide colloid particles and, therefore, the population of second metal oxide colloid particles has a relatively large zeta potential and is prevented from aggregation.

Incidentally, in aggregating the colloid particles, if the pH of the sol is changed to pass though the isoelectric point of the colloid particles intended to be aggregated, the zeta potential of the colloid particles becomes zero when the pH of the sol passes through the isoelectric point thereof, so that aggregation of the colloid particles can be unfailingly attained.

The pH of the sol can be adjusted by adding any acid or alkali. Examples of the acid which can be used include mineral acids such as nitric acid and hydrochloric acid, and examples of the alkali which can be used include aqueous ammonia and sodium hydroxide. The pH of the sol can also be adjusted by merely mixing multiple species of sols.

The pH of the sol can be adjusted by a method of adding an acid or an alkali to the sol while measuring the pH of the sol by a pH meter, or a method of predetermining the amount of acid or alkali necessary for the pH adjustment by using a previously sampled sol, and adding an acid or alkali to the entire sol in the predetermined amount.

<Aggregation of Second Metal Oxide Colloid Particles>

In the process of the present invention, the pH of the sol is then adjusted to be closer to the isoelectric point of the population of second metal oxide colloid particles than to the isoelectric point of the population of ceria-zirconia solid solution colloid particles, thereby aggregating the population of second metal oxide colloid particles onto the periphery of the population of ceria-zirconia solid solution colloid particles aggregated.

When the pH of the sol containing the population of ceria-zirconia solid solution colloid particles aggregated is changed to the vicinity of the isoelectric point of the population of second metal oxide colloid particles, such as a population of ceria or zirconia colloid particles, the zeta potential of the population of second metal oxide colloid particles becomes small and this allows for less generation of electrical repulsion between the particles, whereby aggregation of the population of second metal oxide colloid particles is accelerated. At this stage, the pH of the sol is relatively distant from the isoelectric point of the population of ceria-zirconia solid solution colloid particles, so that the population of ceria-zirconia solid solution colloid particles can be prevented from aggregation and the population of second metal oxide colloid particles can deposit onto the periphery of the population of ceria-zirconia solid solution colloid particles aggregated.

The pH of the sol can be adjusted in the same manner as in the above-described aggregation of the ceria-zirconia solid solution.

<Drying and Firing of Aggregate>

The thus-obtained aggregate is dried and fired, whereby a metal oxide particle comprising a core part relatively rich in a ceria-zirconia solid solution and a surface layer relatively rich in a second metal oxide, the core part and the surface layer each comprising a plurality of primary particles, is obtained.

The removal and drying of a dispersion medium from a sol may be performed by any method at any temperature. For example, this can be achieved by placing the sol in an oven at 120° C. The material obtained by removing and drying the dispersion medium from the sol is fired, whereby the metal oxide particle can be obtained. The firing may be performed at a temperature generally employed for producing metal oxides, for example at a temperature of 500 to 1,100° C.

The present invention is described in greater detail below by referring to Examples, but the present invention is not limited thereto.

EXAMPLES

In the following tests, the pH of the sol was measured by using a pH meter wherein the pH meter electrode was directly dipped in the sol.

Example 1

In this Example, a metal oxide particle comprising a core part relatively rich in ceria-zirconia solid solution and a surface layer relatively rich in ceria and yttrium oxide (yttria) is obtained, and platinum is supported thereon.

Cerium ammonium nitrate and zirconium oxynitrate dihydrate were dissolved in distilled water such that a ceria ($CeO_2$): zirconia ($ZrO_2$) weight ratio becomes 60:40 to obtain 0.5 mol of a mixed aqueous solution. This mixed solution was aged at 120° C. for 72 hours in a pressure vessel, whereby a sol containing a population of ceria-zirconia solid solution colloid particles was obtained.

Thereafter, an acid-stabilized sol containing the population of ceria-zirconia solid solution colloid particles (isoelectric point: pH 8.2) obtained above was mixed with an alkali-stabilized ceria sol (isoelectric point: pH 4.0) and an alkali-stabilized yttria ($Y_2O_3$) sol to give a weight ratio of 58:38:4 among ceria, ceria-zirconia solid solution and yttria. To this sol mixture, an aqueous ammonia ($NH_3$) solution was added dropwise with stirring to adjust the pH to 10, thereby aggregating the population of ceria-zirconia solid solution colloid particles. Thereafter, an aqueous nitric acid ($HNO_3$) solution was added dropwise to the sol mixture with stirring to adjust the pH to 3.0, thereby aggregating ceria and yttria. The resulting solution was dried at 120° C. for 24 hours, and the dried product was fired at 700° C. for 5 hours to obtain metal oxide particles.

The thus-obtained metal oxide particles were dispersed in distilled water which was in an amount of 6-fold weight, a dinitrodiammine platinum solution was added thereto so that platinum is in an amount of 1.0 wt % based on the metal oxide particles, and the resulting solution was stirred for 1 hour. Thereafter, the water content was removed by drying at 120° C., the residue was fired at 500° C. for 2 hours, and the obtained catalyst was shaped into a 1 mm-square pellet and used for the evaluation of performance.

Example 2

In this Example, a metal oxide particle comprising a core part relatively rich in ceria-zirconia solid solution and a surface layer relatively rich in zirconia and yttria is obtained, and rhodium is supported thereon.

A sol containing a population of ceria-zirconia solid solution colloid particles was obtained in the same manner as in Example 1.

Thereafter, an acid-stabilized sol containing the population of ceria-zirconia solid solution colloid particles (isoelectric point: pH 8.2) obtained above was mixed with an alkali-stabilized zirconia sol (isoelectric point: pH 3.5) and an alkali-stabilized yttria sol to give a weight ratio of 58:38:4 among zirconia, ceria-zirconia solid solution and yttria. To this sol mixture, an aqueous ammonia solution was added dropwise with stirring to adjust the pH to 10, thereby aggregating a population of ceria-zirconia solid solution colloid particles. Thereafter, an aqueous nitric acid solution was added dropwise to the sol mixture with stirring to adjust the pH to 3.0, thereby aggregating zirconia and yttria. The resulting solution was dried at 120° C. for 24 hours, and the dried product was fired at 700° C. for 5 hours to obtain metal oxide particles.

The thus-obtained metal oxide particles were dispersed in distilled water which was in an amount of 6-fold weight, a rhodium nitrate solution was added thereto so that rhodium is in an amount of 0.5 wt % based on the metal oxide particles, and the resulting solution was stirred for 1 hour. Thereafter, the water content was removed by drying at 120° C., the residue was fired at 500° C. for 2 hours, and the obtained catalyst was shaped into a 1 mm-square pellet and used for the evaluation of performance.

Comparative Example 1

In this Example, platinum is supported on zirconia powder to which yttria has been added.

Platinum was loaded on the zirconia powder (yttria content: 3 wt %) in the same manner as in Example 1. The obtained catalyst was shaped into a 1 mm-square pellet and used for the evaluation of performance.

Comparative Example 2

In this Example, rhodium is supported on zirconia powder.

Rhodium was loaded on zirconia powder in the same manner as in Example 2. The obtained catalyst was shaped into a 1 mm-square pellet and used for the evaluation of performance.

Comparative Example 3

In this Example, platinum is supported on ceria powder.

Platinum was loaded on ceria powder in the same manner as in Example 1. The obtained catalyst was shaped into a 1 mm-square pellet and used for the evaluation of performance.

Comparative Example 4

In this Example, rhodium is supported on ceria powder.

Rhodium was loaded on ceria powder in the same manner as in Example 2. The obtained catalyst was shaped into a 1 mm-square pellet and used for the evaluation of performance.

Comparative Example 5

In this Example, a metal oxide particle consisting of ceria-zirconia-yttria solid solution is obtained, and platinum is supported thereon.

Cerium ammonium nitrate, zirconium oxynitrate dihydrate and yttria nitrate were added to distilled water to give a weight ratio of 58:38:4 among ceria, zirconia and yttria and dissolved with stirring. To this solution, an aqueous ammonia solution was added dropwise with stirring to adjust the pH to 9, thereby causing precipitation. The resulting solution was dried and fired in the same manner as in Example 1 to obtain metal oxide particles.

On the thus-obtained metal oxide particles, platinum was loaded in the same manner as in Example 1. The obtained catalyst was shaped into a 1 mm-square pellet and used for the evaluation of performance.

Comparative Example 6

In this Example, a metal oxide particle consisting of a ceria-zirconia-yttria solid solution is obtained, and rhodium is supported thereon.

Metal oxide particles consisting of ceria-zirconia-yttria solid solution were obtained in the same manner as in Comparative Example 5. On this metal oxide particles, rhodium was loaded in the same manner as in Example 2. The obtained catalyst was shaped into a 1 mm-square pellet and used for the evaluation of performance.

Comparative Example 7

In this Example, a metal oxide particle comprising a core part relatively rich in zirconia and a surface layer relatively rich in ceria and yttria is obtained, and platinum is supported thereon.

An acid-stabilized zirconia sol (isoelectric point: pH 8.5) was mixed with an alkali-stabilized ceria sol (isoelectric point: pH 3.5) and an alkali-stabilized yttria ($Y_2O_3$) sol to give a weight ratio of 58:38:4 among ceria, zirconia and yttria. To this sol mixture, an aqueous ammonia solution was added dropwise with stirring to adjust the pH to 10, thereby aggregating zirconia.

Thereafter, an aqueous nitric acid solution was added dropwise to the sol mixture with stirring to adjust the pH to 3.0, thereby aggregating ceria and yttria. The resulting solution was dried and fired in the same manner as in Example 1 to obtain metal oxide particles.

On the thus-obtained metal oxide particles, platinum was loaded in the same manner as in Example 1. The obtained catalyst was shaped into a 1 mm-square pellet and used for the evaluation of performance.

<Evaluation of Catalyst Performance>

The pellet-like catalyst obtained in Examples 1 and 2 and comparative examples 1 to 7 were subjected to rich and lean gases each having a composition shown in Table 1. The gases were passed through the catalysts at 1,000° C. for 5 hours and were switched over every one minute. Thereafter, rich and lean gases each having a composition shown in Table 1 were passed through the catalyst and switched over at 1 Hz and at an elevated gas temperature, thereby determining the temperature where the HC (hydrocarbon) purification ratio reached 50% (HC-T50). Also, CO (2%) and $O_2$ (1%) were passed with switching thereover every one minute, and the OSC (oxygen storage capacity) ($O_2$ mmol/support-g) was calculated from the amount of $CO_2$ generated while providing CO. Furthermore, the specific surface area (SSA) was measured by using a BET one-point method. In addition, the platinum particle diameter of catalyst was determined by a CO pulse adsorption method at −80° C. The results obtained are shown in Table 2.

TABLE 1

| | Gas Composition | | | | | | | |
|---|---|---|---|---|---|---|---|---|
| | $N_2$ (%) | $CO_2$ (%) | NO (ppm) | CO (%) | $C_3H_6$ (ppmC) | $H_2$ (%) | $O_2$ (%) | $H_2O$ (%) |
| Rich Gas | balance | 10 | 2200 | 2.80 | 2500 | 0.27 | 0.77 | 10 |
| Lean Gas | balance | 10 | 2200 | 0.81 | 2500 | 0 | 1.7 | 10 |

TABLE 2

Catalyst Performance after Rich/Lean Endurance at 1,000° C.

| | Catalyst Support | Noble Metal | HC-T50 (° C.) | OSC*1 | SSA (m$^2$/g) | Pt Particle diameter (nm) |
|---|---|---|---|---|---|---|
| Ex. 1 | surface (Ce,Y)O$_x$-core (Ce, Zr)O$_x$ | Pt | 238 | 0.42 | 28 | 7 |
| Ex. 2 | surface (Zr,Y)O$_x$-core (Ce, Zr)O$_2$ | Rh | 256 | 0.38 | 27 | — |
| Comp. Ex. 1 | (Zr, Y)O$_x$ | Pt | 294 | 0.00 | 23 | 18 |
| Comp. Ex. 2 | ZrO$_2$ | Rh | 276 | 0.00 | 28 | — |
| Comp. Ex. 3 | CeO$_2$ | Pt | 302 | 0.02 | 12 | 23 |
| Comp. Ex. 4 | CeO$_2$ | Rh | 354 | 0.05 | 9 | — |
| Comp. Ex. 5 | (Ce, Zr, Y)O$_x$ | Pt | 272 | 0.31 | 27 | 16 |
| Comp. Ex. 6 | (Ce, Zr, Y)O$_x$ | Rh | 351 | 0.29 | 27 | — |
| Comp. Ex. 7 | surface (Ce,Y)O$_x$-core ZrO$_2$ | Pt | 251 | 0.30 | 26 | 12 |

*Unit of OSC: O$_2$ mmol/support-g

As apparent from Table 2, the catalysts of Examples 1 and 2 have a low HC-T50 temperature, namely, exhibit high activity even at a relatively low temperature, as compared with the catalysts of Comparative Examples 1 to 7 using the same noble metals.

This is considered to be ascribable to the following advantages of the present invention:

the catalysts of Examples 1 and 2 of the present invention have large OSC by virtue of the ceria-zirconia solid solution, despite the presence of ceria in the surface layer;

as seen from the measurement results of specific surface area, the catalysts of Examples 1 and 2 of the present invention maintain the large specific surface area like as the ceria-zirconia solid solution or zirconia support (Comparative Examples 1, 2 and 5 to 7);

as seen in the "Pt Particle diameter", the catalyst of Example 1 of the present invention is more successfully protected from the sintering of the platinum than that using a ceria-zirconia solid solution (Comparative Example 5), by virtue of the presence of ceria mainly consisting the surface layer; and the catalyst of Example 2 exhibits good catalyst performance owing to the rhodium supported on zirconia and is lower in the HC-T50 temperature than the catalyst obtained by loading rhodium on a ceria-zirconia solid solution (Comparative Example 6).

The invention claimed is:

1. An exhaust gas purifying catalyst comprising platinum supported on a metal oxide particle comprising a core part and a surface layer, wherein:
a molar fraction of cerium and zirconium constituting a ceria-zirconia solid solution in the core part to all the metals in the core part is higher than a molar fraction of the cerium and zirconium constituting a ceria-zirconia solid solution in the surface layer to all the metals in the surface layer; and
a molar fraction of cerium constituting ceria in the surface layer to all the metals in the surface layer is higher than a molar fraction of the cerium constituting the ceria in the core part to all the metals in the core part,
wherein said core part and said surface layer each comprises a plurality of primary particles, and the primary particles constituting said core part are particles of ceria-zirconia solid solution.

2. The exhaust gas catalyst according to claim 1, wherein said surface layer further comprises an oxide of at least one metal selected from the group consisting of alkaline earth metals and rare earths.

3. The exhaust gas catalyst according to claim 1, wherein the total molar fraction of cerium and zirconium is at least 85 mol % based on the total molar number of metals in the metal oxide particles.

4. A process for producing an exhaust gas purifying catalyst, the method comprising:
producing metal oxide particles including:
providing a sol containing at least a population of ceria-zirconia solid solution colloid particles and a population of ceria colloid particles differing in the isoelectric point with each other,
adjusting the pH of said sol to be closer to the isoelectric point of said population of ceria-zirconia solid solution colloid particles than to the isoelectric point of said population of ceria colloid particles, thereby aggregating said population of ceria-zirconia solid solution colloid particles,
adjusting the pH of said sol to be closer to the isoelectric point of said population of ceria colloid particles than to the isoelectric point of said population of ceria-zirconia solid solution colloid particles, thereby aggregating said population of ceria colloid particles onto said population of ceria-zirconia solid colloid particles aggregated, and
drying and firing the obtained aggregate; and
loading platinum on said metal oxide particles: wherein:
the metal oxide particle comprises a core part and a surface layer;
a molar fraction of cerium and zirconium constituting a ceria-zirconia solid solution in the core part to all the metals in the core part is higher than a molar fraction of the cerium and zirconium constituting a ceria-zirconia solid solution in the surface layer to all the metals in the surface layer; and
a molar fraction of cerium constituting ceria in the surface layer to all the metals in the surface layer is higher than a molar fraction of the cerium constituting the ceria in the core part to all the metals in the core part;
wherein said core part and said surface layer each comprises a plurality of primary particles, and the primary particles constituting said core part are particles of ceria-zirconia solid solution.

5. The process according to claim 4, wherein a difference between the isoelectric points of said population of ceria-zirconia solid solution colloid particles and said population of ceria colloid particles is 3 or more.

6. The process according to claim 4, wherein:
the pH of said sol is changed to pass through the isoelectric point of said population of ceria-zirconia solid solution colloid particles to aggregate said population of ceria-zirconia solid solution colloid particles; and the pH of said sol is changed to pass through the isoelectric point of said population of ceria colloid particles to aggregate said population of ceria colloid particles.

* * * * *